Aug. 14, 1951        C. D. GIBSON        2,564,002

POWER-DRIVEN MATERIAL HANDLING TRUCK

Filed Sept. 20, 1949        6 Sheets-Sheet 1

Inventor
CHRISTIAN D. GIBSON
Attorney

Fig. 10.

Patented Aug. 14, 1951

2,564,002

UNITED STATES PATENT OFFICE 2,564,002

POWER-DRIVEN MATERIAL HANDLING TRUCK

Christian D. Gibson, Greene, N. Y., assignor to Lyon-Raymond Corporation, Greene, N. Y., a corporation of New York Application September 20, 1949, Serial No. 116,777

14 Claims. (Cl. 180—13)

This invention relates to power driven material handling trucks of the general type employed in factories, warehouses, etc. to pick up goods carried on skids or pallets, transport them from one point to another and deposit them in the desired location with a minimum, or even with no manual handling of the goods. More particularly the invention relates to power driven material handling trucks having elevating mechanism of such a nature that the truck may be used to pile goods in tiers along the sides of the aisles of a warehouse or the like.

A general object of the invention is so to improve the construction and arrangement of the parts of a power driven material handling truck for the general purposes aforementioned that the width of the aisle space required for the movement of the truck into and out of its load-receiving or load-delivering position is reduced to a minimum.

Power driven material handling trucks, as heretofore constructed, have usually comprised either four wheel trucks with the automobile type of steering or three wheel trucks with "fifth wheel" steering and have either been of the walking type or the riding type with the operator usually behind and facing the load so that he is not in the way of the handling of the load and can see better to steer the truck and its load into proper loading or unloading position.

It will be apparent that four wheel trucks with the automobile type of steering have a limited turning radius and that three wheel trucks with fifth wheel wide angle steering do not have the lateral stability that four wheel trucks have. It will further be apparent that the overall length of a truck, whether it be a three wheel or a four wheel truck, which utilizes a part of its length solely to provide space for a riding operator, will be increased by the necessity for providing such riding space and that no useful saving in truck length or area required for turning is effected by having the operator walk behind the truck, since he must have space in which to move in order to steer and control the operations of the truck. Even where the riding operator's platform is not so located as to increase the overall length of the truck, as, for example, at one side of a part of the operating mechanism, the truck has usually been of the three wheel, fifth wheel steer type, with the fifth wheel steer located on the axis of symmetry of the truck, and the truck has thus lacked lateral stability. Moreover, when the truck has been four-wheeled for lateral stability, it has usually been provided with the automobile type of steering and has thus had a limited turning angle.

A particular object of the present invention is to combine the advantages of the fifth wheel steering of the driving wheel or wheels, so far as shortening of the turning radius is concerned, with the advantages of the four wheel support so far as lateral stability is concerned. To this end the invention aims to provide a truck having fifth wheel steering of a driving wheel which is located at one side of the axis of symmetry of the truck and having a supplemental supporting wheel freely castered to accomodate itself to the turning movements of the truck which are produced by the short radius and wide angle of steering of the fifth wheel, this supplemental wheel or caster being located on the other side of the axis of symmetry from the fifth wheel steered driving wheel. By thus driving the truck through a fifth wheel supported and controlled steering wheel while providing four wheel support for stability, the manipulation and steering of the truck has all the facility and range of a three wheel truck having a fifth wheel steered driving and steering wheel, without the marked instability of such trucks, particularly when in motion.

Important features of the invention are the arrangement of the motor, the gear reduction, the combined driving and steering wheel, etc., as a unit mounted in a swiveling turret, this driving and steering unit being relatively high and slender to leave ample space for the riding operator at one side of the unit, and the arrangement of the caster, which acts as a fourth supporting wheel, so that it can swivel freely through a full 360°, thus providing a truck having four wheel support, in fact, one which may have a supporting wheel located near each of its four corners, which can turn exactly the same as though it were a three-wheeled vehicle with fifth wheel steer. Another important feature of the invention is the arrangement of the parts of the truck so that a battery, which is relatively wide and high but thin along the longitudinal dimension of the truck, may be used, thus further making possible a saving in truck length.

Other objects, important features and advantages of the invention, to which reference has not hereinabove specifically been made, will appear hereinafter when the following description and claims are considered in connection with the accompanying drawings, in which—

In the illustrative embodiment of the invention, the truck is shown as comprising a power unit having a frame comprising a base portion 2 of the contour shown in Figure 2 and an upright supporting frame and enclosing casing 4 shown more fully in Figures 1, 3, 8 and 9, the front plane part or wall 6 of the upright frame and casing preferably extending below the base portion 2 of the power unit and serving as a part to which different types of elevating mechanism may be attached, thus making the power portion of the truck adaptable to various types of material handling trucks.

Figure 1:
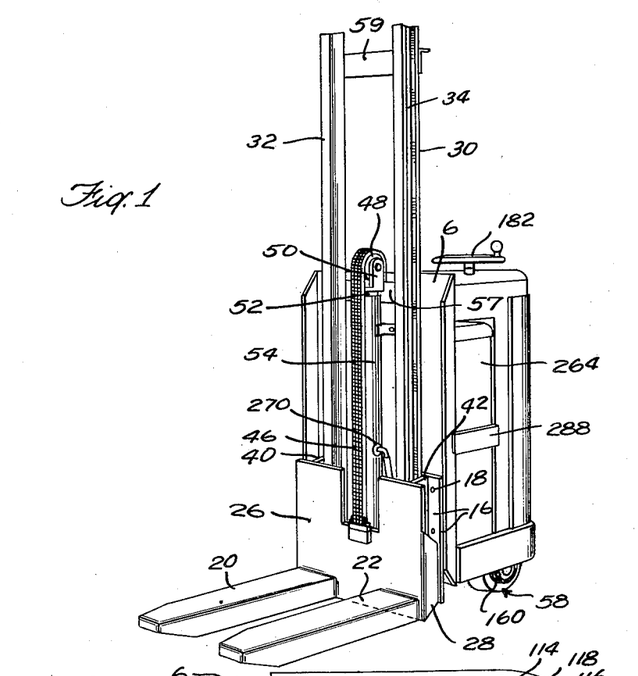
Figure 1 is a perspective view of a power operated material handling truck of the tiering type which embodies the present invention.
Figure 3:
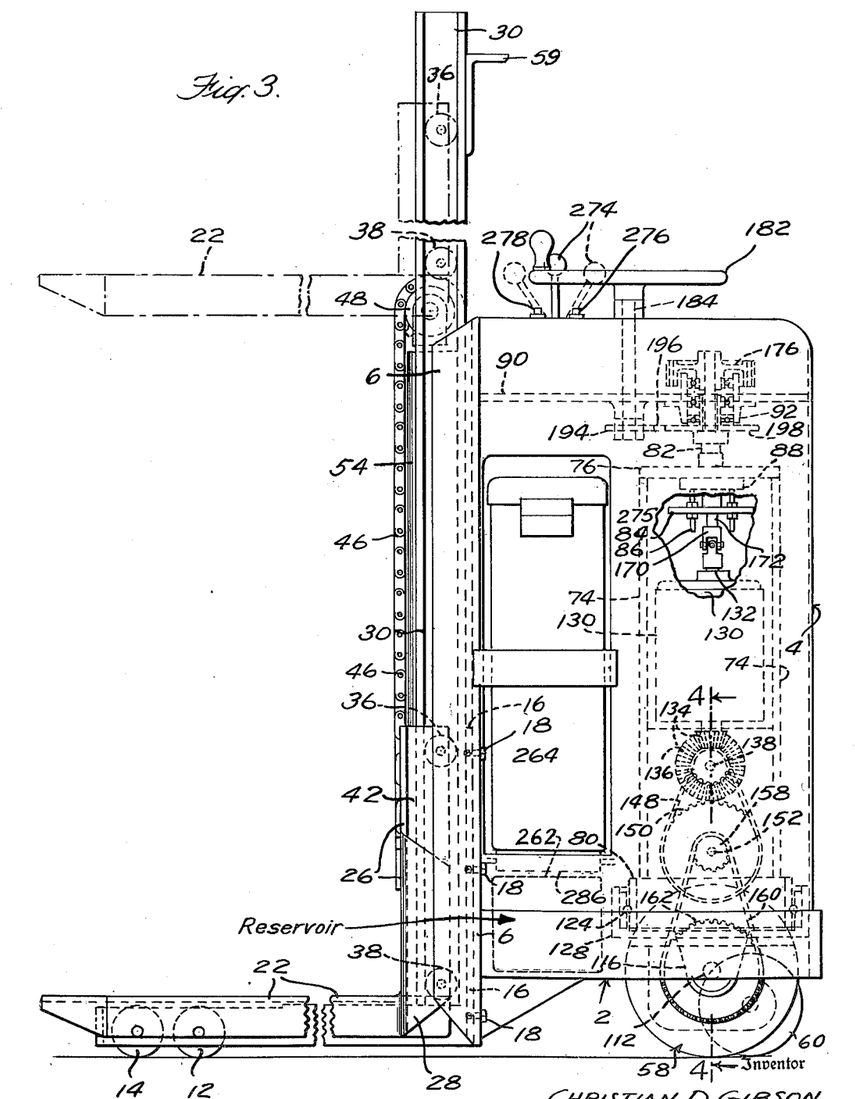
Figure 3 is a side elevation of the truck shown in Figure 1, with interior mechanism shown in dotted lines.

As shown in Figures 1 and 3, the illustrated elevating or load-lifting part of the truck is of the tiering type designed for use with skid platforms and comprises spaced forwardly extending arms 8 and 10, constituting a part of the truck base and having bearings for tandem supporting wheels or rollers 12 and 14, the arms 8 and 10 being connected to each other at their rear ends by a transverse vertical plate 16 welded or otherwise rigidly secured to said arms, this plate 16 being tapped to receive machine screws or bolts 18 by which the lifting mecahnism as a whole is attached to the front plate 6 of the power unit frame.

The illustrated lifting mechanism comprises a lifting platform or fork made up of forwardly extending arms 20 and 22 which have downwardly projecting stiffening flanges that embrace the truck supporting wheel or roller carrying arms 8 and 10 when the arms 20 and 22 are in their lowered position. The arms 20 and 22 at their rear ends are connected by a cross plate 26 of considerable vertical extent, this plate being welded or otherwise secured to the arms and having at each side a rearwardly extending protective flange or guard 28 which also serves to stiffen the plate 26.

Fixed upon the wheel carrying arms 8 and 10 and also welded to the vertical plate 16 are vertical track members 30 and 32 having track grooves 34 therein. These parts may be formed in any suitable manner, as, for eaxmple, of steel bars of rectangular section having the track grooves 34 machined therein. The track grooves 34 serve as vertical guides for upper and lower carriage wheels 36 and 38 carried on vertical plates or bars 40 and 42 welded or otherwise rigidly secured to the rear face of the transverse plate 26 of the skid carrying fork or platform. Each of the wheels or rollers 36 and 38 is mounted to turn on a transverse shaft extending through the plate or bar 40 or 42 and secured in position by a nut 44. By thus providing upper and lower rolls or wheels 36 and 38 travelling in the track grooves 34 in the uprights 30 and 32, provision is made for insuring lifting of the load with the load-supporting fork arms 20 and 22 in constant horizontal parallelism.

The lifting mechanism is preferably hydraulically operated, the transverse plate or back 26 of the skid-carrying fork or platform having connected thereto a chain 46 which passes over a pulley 48 carried in a fork 50 on the upper end of a piston or plunger 52 of a vertical hydraulic ram or jack 54 mounted at its lower end upon a bracket 56 connected to the front of the cross plate 16 that connects the wheel carrying arms 8 and 10. At its other end the chain 46 is connected to a cross-bar 57 on the track members 30 and 32. It will be seen that, when hydraulic fluid, such as oil, is introduced under pressure into the cylinder of the ram or jack 54 of the hydraulic lifting mechanism to cause the plunger to move upwardly, for each inch of vertical movement of the plunger there will be two inches of vertical movement of the skid lifting fork or platform 20, 22, 26 of the lifting mechanism. To provide for lateral rigidity of the track bars 30 and 32, they are preferably connected at their upper ends by any suitable cross connection 59, preferably located at one side of the path of movement of the pulley 48 carried by the piston or plunger 52, the assembled structure forming what is usually termed the "mast" of a "tiering" truck.

As above suggested, the particular form of lifting mechanism which is connected to the power unit of the present invention, now to be described, may be varied. In fact, the whole lifting mechanism may be disconnected from the power unit by unscrewing the machine screws 18 and disconnecting the hydraulic mechanism and substituting another unit therefor, it being only important that the lifting unit have laterally spaced supporting wheels in order that the material-handling truck as a whole may have four-wheel support.

Referring now to the power unit, the construction and arrangement of the parts of which constitute most important features of the invention, this comprises a power driven combined steering and driving wheel 58 mounted in a turret, to be more fully described hereinafter, carried upon the base frame 2 of the power unit at one side of the axis of symmetry both of this unit and of the truck as a whole. To provide lateral stability in view of this mounting of the steering and driving wheel at one side of the axis of symmetry, a caster is mounted to swivel in the power unit base at the opposite side of the axis of symmetry from the steering and driving wheel 58, this caster comprising a pair of wheels 60 having bearings in a forked lever 62 fulcrumed upon a pivot 64 carried by a depending bracket 66 on the under side of a swivel plate 68 turning about a swivel pin 70 suitably secured in the base 2 of the power unit. Any suitable antifriction bearings may be provided between the swivel plate 68 and the pin 70 and between said swivel plate and the under side of the base structure to insure free turning of the caster which is mounted to turn freely through 360°, the wheels 60, as in all caster constructions being offset from the swivel axis. Other important features of the caster construction and mounting will be referred to hereinafter.

As hereinabove pointed out, the combined steering and driving wheel 58 is mounted at one side of the axis of symmetry of the truck, and preferably near a rear corner of the truck, for reasons hereinabove suggested and which will be explained in greater detail hereinafter.

Figure 5:
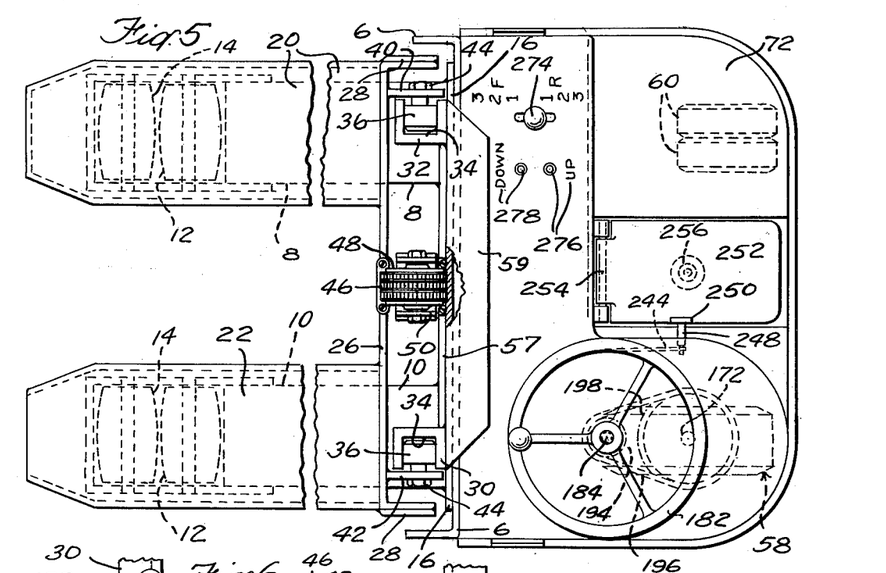
Figure 5 is a top plan view of the truck shown in Figures 1 and 3, interior mechanisms being partially shown in dotted lines.

Referring more particularly to Figure 5 of the drawings, it will be seen that by mounting the steering and driving wheel 58 at one side of the axis of symmetry and arranging the motor and transmission in a relatively narrow turret extending vertically above the steering and driving wheel, room is provided for a riding platform 72 for the operator at the other side of the truck without increasing the length of the truck, the lateral stability of the truck being maintained by locating the caster just described beneath this platform 72 and near a rear corner of the truck.

Figure 4:
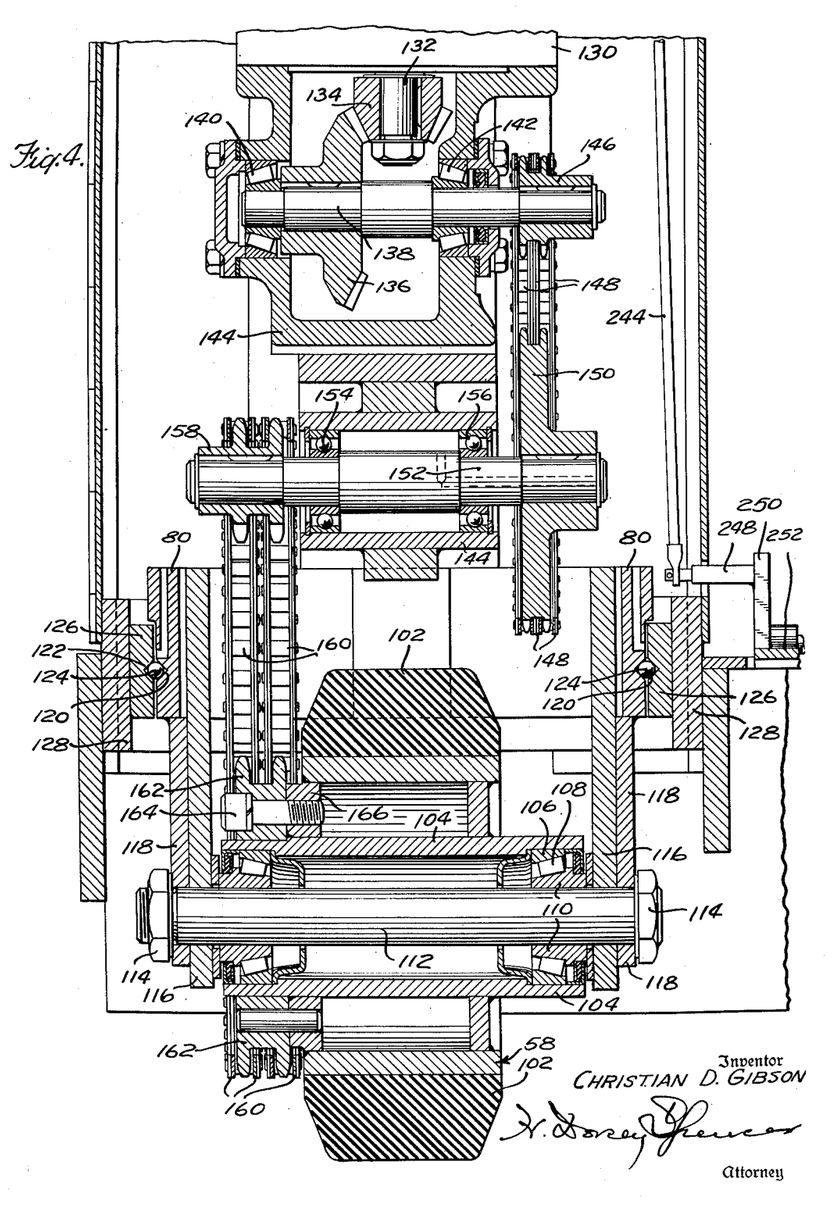
Figure 4 is an enlarged section of the transmission through which the combined steering and driving wheel is driven from the electric driving motor, this section being taken on the line 4—4 of Figure 3.
Figure 9:
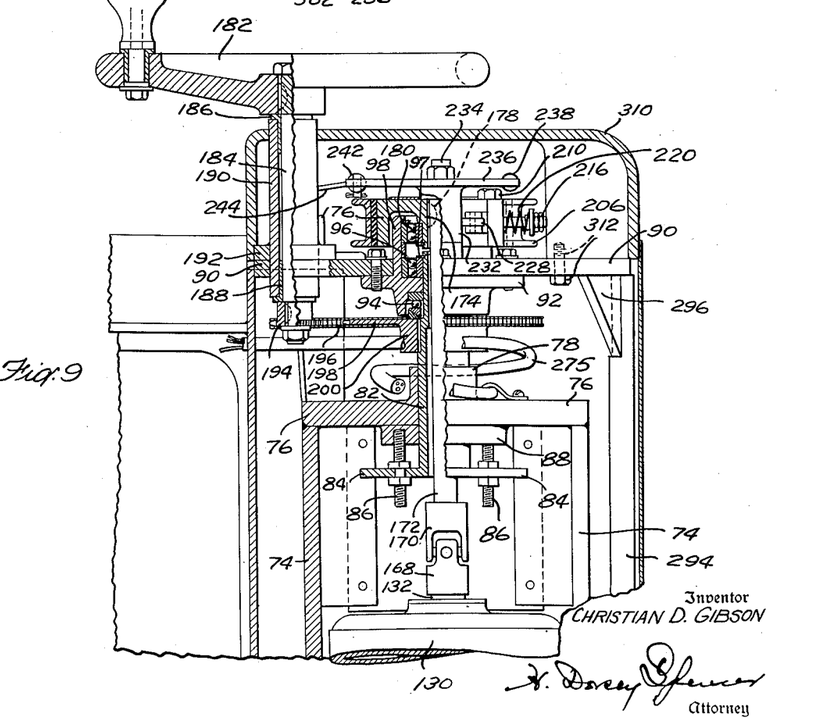
Figure 9 is a longitudinal section of the upper part of the steering and braking mechanism with the parts in their assembled relation, this view also showing provision for vertical adjustment of the steering and driving wheel to compensate for tire wear, the section being taken on the line 9—9 of Figure 8.

As shown in Figure 5 and in greater detail in Figures 3, 4 and 9, the turret is located in the upright casing 4 in the left hand rear corner of the truck and comprises a frame made up of lateral upright bars 74, a top plate 76 having a central hub 78 and an annular bottom member 80 connected to the side members 74. The hub 78 surrounds a cylindrical sleeve-like member 82 having a flange 84 at its lower end adjustably connected by threaded rods or studs 86 to a hublike boss 88 on the under face of the turret head 76 to permit relative vertical adjustment of the turret and the cylindrical sleeve 82 to compensate for wear of the tire of the steering and driving wheel, as hereinafter more fully set forth. The sleeve-like member 82 extends upwardly through a stationary cross head 90 in the casing 4 and through a circular plate 92 bolted to the under side of the cross head 90 and having a hublike boss in which thrust bearings 94, bearing against a shouldered portion of the sleeve-like member 82, are located. The upper end of the member 82 is confined within annular bearings 96 located in a cylindrical extension 98 of the plate 92 through and above the cross head 90. A snap ring 97, entering an annular groove in the upper end of the member 82 locks it against movement away from the thrust bearing 94.

The steering and driving wheel 58, preferably provided with a rubber tire 102, has a cylindrical hub 104 in the shouldered ends of which are located the raceways or cups 106 of roller bearings 108, the cones 110 of which are carried upon a shaft 112 secured at its ends by nuts 114 in fork members 116 which have connected thereto reinforcing pieces 118 bearing against and welded to the bottom edge of the annular bottom member 80 of the turret. The fork members 116 are also welded to the ring 80.

The bottom member 80 of the turret is provided with a ball race 120 between which and an annular ball race 122 in a ring 126, mounted for vertical sliding movement in an annular fixed part 128 of the turret enclosing frame and housing, are ball bearings 124 to facilitate the turning movements of the turret.

The steering and driving wheel 58 is driven by connections to an electric motor 130 located in the upper part of the turret and having its driving shaft 132 turning about a vertical axis. The driving shaft 132 extends from both ends of the motor 130 and its lower extension carries a bevel pinion 134 that engages a bevel gear 136 on a horizontal shaft 138 mounted in bearings 140 and 142 in a frame 144 connected to the lower side of the motor housing, the motor housing being fixed in the turret to turn therewith.

Attached to the right hand end of the shaft 138 in Figure 4 is a small sprocket wheel 146 connected by a sprocket chain 148 with a larger sprocket wheel 150 on the right hand end of a shaft 152 mounted in bearings 154 and 156 in the welded turret assembly. At its other end the shaft 152 has keyed thereto a small sprocket wheel 158 connected by a sprocket chain 160 to a relatively larger sprocket wheel 162 fixed upon the driving wheel 58 in any suitable manner as, for example, by machine screws 164 that are screwed into the side wall or disk 166 of the wheel 58.

From the foregoing description of the transmission connecting the driving shaft 132 of the electric motor 130 with the driving wheel 58, it will be seen that the relatively high speed of the shaft 132 is reduced by the transmission to a relatively low speed of turning of the drive wheel 58, preferably to a maximum speed in the neighborhood of four miles per hour. At the same time the torque of the motor shaft 132 is converted into a relatively high turning torque upon the hub 104 of the driving wheel 58.

That part of the driving shaft 132 of the motor 130 which extends above the upper end of the motor has connected thereto one part 168 of a universal joint connection, the other part 170 of which is connected to a shaft 172 extending up through the cylindrical member 82 into the hub 174 of the brake drum 176. The shaft 172 is connected to the hub 174 of the brake drum 176 by a key 178 having a loose sliding fit in the keyway in the shaft 172 so that the shaft 172 may slide in the hub 174 as the turret is adjusted vertically on the studs 86, as hereinabove pointed out, to compensate for wear of the tire 102 of the wheel 58. The hub 174 of the drum 176 is mounted in ball bearings 180 held in the upward cylindrical extension 98 of the plate 92.

Turning of the turret to steer the truck is effected through a steering wheel 182 attached to the upper end of a steering shaft 184 mounted in bushings 186 and 188 in a bearing tube 190 having a flange 192 by which it is fixed upon the cross head 90 of the frame that encloses and supports the turret. At its lower end the shaft 184 has attached thereto a small sprocket wheel 194 connected by a sprocket chain 196 to a larger sprocket wheel 198 keyed to the cylindrical member 82 which constitutes a part of the turret vertical adjusting mechanism but is connected to the turret to turn therewith. Since the cylindrical member 82 does not itself move vertically in the vertical adjustment of the turret, the sprocket wheel 198 remains in a fixed vertical position in the turret enclosing housing, any adjustment of the turret vertically simply sliding the hub 78 of the turret toward or away from the under side of the hub 200 of the sprocket wheel 198.

The brake mechanism comprises the brake drum 176, hereinabove described, which is connected to the upper end of the shaft 172, and the brake shoes 202 and 204 which are carried on or formed on levers 206 and 208 fulcrumed respectively on studs 210 and 212 projecting upwardly from the cross head 90. The free ends of the brake levers 206 and 208 are provided with spring receiving sockets through which extends a rod 214 threaded at its ends to receive nuts 216 which serve to hold washers 218 in engagement with the outer ends of springs 220 located in the sockets in the arms 206 and 208 and tensioned to press the brake shoes 202 and 204 normally into braking engagement with the brake drum 176.

Near their outer ends the arms 206 and 208 are provided with adjustable roller carrying studs 222 and 224. The studs 222 and 224, which are secured in adjusted position in the arms 206 and 208 by clamp nuts 226, carry at their inner ends small rollers 228 and 230 which engage a brake releasing cam 232 mounted on a vertical stud 234 fixed in the cross head 90. Attached to the upper face of the cam 232 is a lever 236 by which the cam 232 may be rocked about the stud 234 to release the brakes, that is, to move the brake levers 206 and 208 away from each other against the tension of the springs 220. The lever 236 is normally moved to the position which applies the brake, that is, to the position that brings the cam 232 into the position shown in Figure 8 of the drawings, by means of a spring 238 connected at one end to the end of the lever 236 and at its other end to a tab 240 secured to the pivot stud 210. The other end of the lever 236 is connected by a clevis 242 and a cord 244 passing over a grooved pulley 246 to a stud 248 projecting to one side of a vertical arm 250 attached to the dead man treadle 252.

Figure 2:
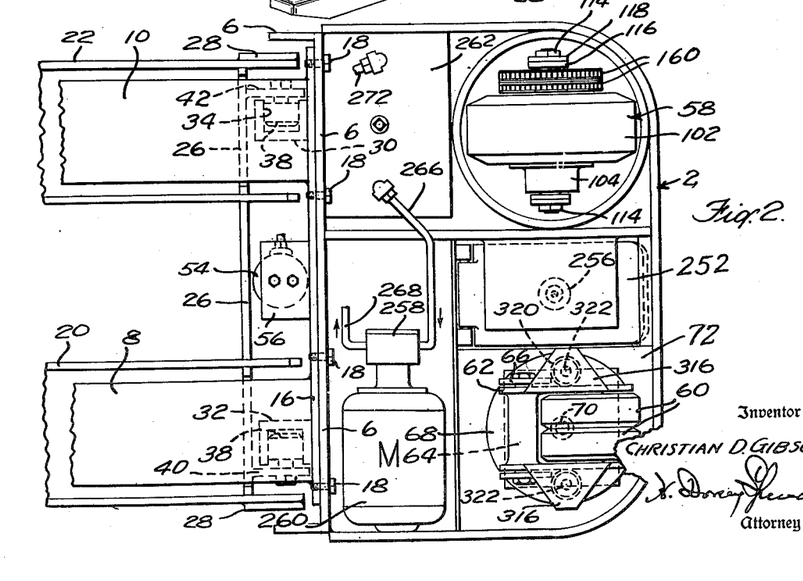
Figure 2 is a bottom plan view of the truck shown in Figure 1, with parts broken away to permit showing other parts of the invention on a larger scale.
Figures 6, 7:
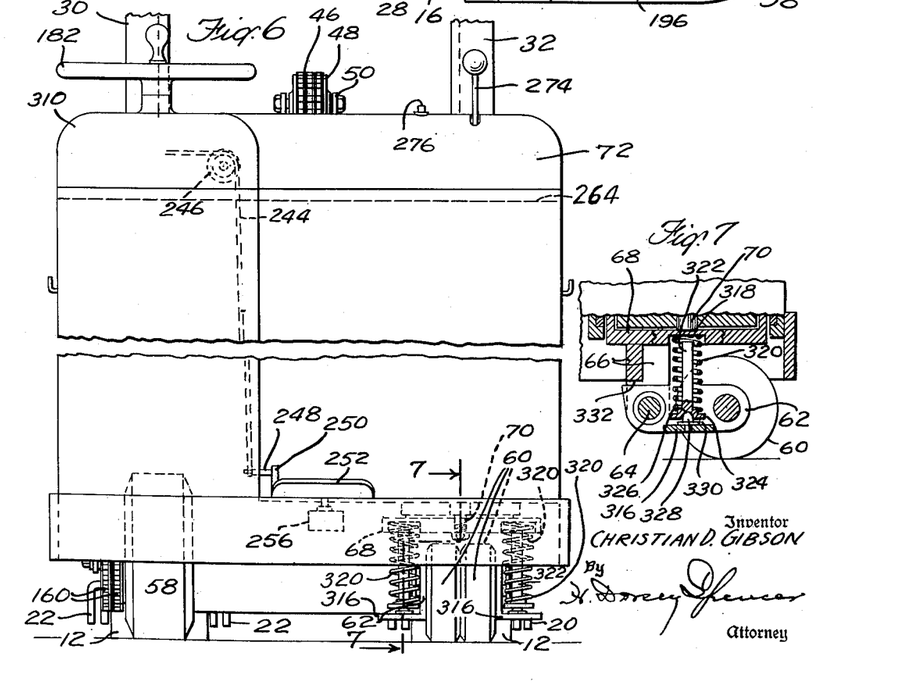
Figure 6 is a rear elevation of the truck, with parts broken away to permit showing the top and bottom structures on a larger scale.
Figure 7 is a sectional detail of the caster mounting, on the line 7—7 of Figure 6.
Figure 8:
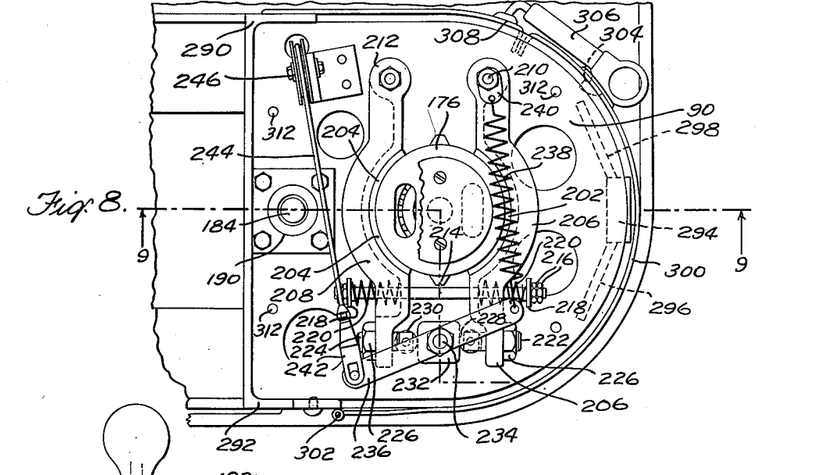
Figure 8 is a top plan view looking down upon the brake mechanism, the steering wheel and the cover of the casing enclosing this mechanism being removed.

The dead man treadle 252, as shown in Figures 2, 5 and 6, constitutes a part of the platform upon which the truck operator rides and is hinged to the platform or to the base frame of the truck at its rear end 254, the treadle being normally elevated both by the action of the spring 238 and by other spring means, if needed, when the operator is not standing on the platform, thereby permitting the brake to be applied at all times when the operator is not in position to control the truck. Not only does the dead man treadle 252 act to release the brake when the operator stands upon it, but it also operates a switch 256 to complete the connections between the driving motor controlling switches and the storage battery. It will thus be seen that as soon as the operator steps off the dead man treadle and it rises under the action of the spring or springs, the brake is at once applied and the source of energy cut off from the electric motor so that the truck is automatically stopped and cannot again be started until the operator again stands on the treadle 252.

The means for supplying oil or other suitable liquid under pressure to the hydraulic jack or ram 54 comprises a pump 258 operated by an electric motor 260, the pump drawing its oil or other liquid from a storage tank 262 mounted in the base frame below the storage battery 264, the pump being connected to the storage tank by an intake pipe 266. The pump forces the oil through a pipe 268 connected to the jack or ram cylinder 54 at any suitable point 270 such as that shown in Figure 1. When the jack is to be lowered the oil is returned to the reservoir or storage tank 262 through a pipe 272, the general arrangement of the oil circuit and the means for controlling the flow thereof being shown in the diagrammatic view, Figure 10. This view also shows the electric circuits including those which control the operation of the oil flow controlling valves, these being preferably solenoid operated valves.

As shown in Figures 5 and 6, the control of the movement of the truck is effected through a controller box located in front of the operator when he stands on the platform 72. This controller box may be of any usual construction operable from a controller handle 274 and is herein shown as designed to provide three speeds forward and three in reverse. It will be understood that additional speeds in either or both directions may be provided if desired. In this connection it may be pointed out that for simplicity of electrical connections between the stationary storage battery and the motor in the turret, the turret is only permitted to turn through an overall angle of about 200° so that reversal of the truck is effected by reversing the direction of rotation of the electric motor 130. This permits a loose coil connection 275 to the motor.

As above suggested, the control of the introduction of the hydraulic liquid into the hydraulic ram or jack is effected electrically. The switches for closing the electric circuit required for such control are also located in front of the operator and may be operated from push buttons as shown, the "up" switch being controlled from a push button 276 and the "down" switch being operated from a push button 278. As will be obvious, the "up" switch closes the circuit which energizes the pump motor 260 and the "down" switch closes a circuit which energizes the solenoid 280 that operates the release valve 282 to let the liquid flow from jack 54 through the branch pipe 284 leading to the solenoid operated valve 282 and from the valve 282 through the pipe 272 back to the oil reservoir 262.

The storage battery compartment is preferably located both in front of the turret housing and in front of the operator's platform and preferably extends across the entire front of the power unit so that a battery of substantial capacity but relatively wide and high in its cross-truck dimensions can be utilized. As shown, this battery rests on rollers 286 which are spaced to form the battery supporting floor of the battery compartment, the end openings into this compartment being preferably provided with readily removable guard plates 288 by which the battery is prevented from accidental movement out of its compartment but which may readily be removed to permit the battery to be rolled out upon any suitable support, such as a rack having rollers similar to the rollers 286, for service.

It will be seen that by locating the battery both in front of the steering column and in front of the operator's platform and extending the battery compartment vertically, it is possible to use a battery which is relatively wide and high in its transverse dimensions, that is, in its vertical and cross truck dimensions, and which is relatively thin along the longitudinal dimension of the truck. This contributes materially to the reduction of the overall length of the truck and therefore to facilitating its manipulation in comparatively narrow aisles.

As hereinabove pointed out, the turret is located within a housing or casing, including the cross head 90 in which the upper bearings of the turret are carried, this cross head being supported upon vertical angle bars 290 and 292 and upon a rear frame bar 294, the latter bar having welded thereto triangular braces 296 and 298 which engage and are also welded to the under side of the cross head 90. A door 300 curved to fit the front of the structure is hinged at 302 and is provided with a socket 304 to receive the hook of a spring catch 306 connected to the stationary part of the housing at 308.

The cover 310 which encloses the brake mechanism rests upon the cross head 90 and is also removable, being secured in its closed condition in any suitable manner as, for example, by a machine screw 312 extending through the cross head 90 and screwed into a bracket 314 attached to the inner side of the head 310.

One of the important features of the invention is the provision for insuring adequate load on the drive wheel 58 at all times in order to provide traction and thus insure control of the truck at all times. In locating the drive wheel at one side of the axis of symmetry and providing the swivel caster upon the other side of said axis to insure lateral stability, the problem was presented of avoiding lifting the drive wheel off the floor when going over uneven floors. This problem has been solved in the illustrative embodiment of the invention by articulating the caster wheel to its swivel in such manner that springs may be interposed between the caster wheel support and the swivel. These springs are strong enough to enable the caster to carry its share of the load and to keep the truck from tipping excessively, while at the same time they are weak enough to let the caster wheel deflect upwardly over a bump, thus allowing the drive wheel to stay on the floor and maintain its traction. It would, of course, be possible to obtain substantially the same effect by providing resilient articulation between the turret and the truck frame. Such an arrangement of the parts would present more complications than the simple caster connections just described.

In the illustrative embodiment of the invention, see particularly Figures 6 and 7, it will be seen that the fork lever 62, in which the caster wheels 60 have their bearings and which is fulcrumed upon a pivot 64 carried by a depending bracket 66 on the under side of the swivel plate 68, has projecting laterally from its two arms bracket supports 316 between which and sockets 318 in the swivel plate 68, springs 320 are located. These springs surround and closely embrace rods 322 and each rod 322 has at its lower end a flange 324 upon which the spring rests and also has in its lower end a socket 326 to receive the rounded or ball end 328 of a stud 330 secured in the bracket 316. The rod 322 is shorter than the spring 320 to permit limited compression of the spring when the caster wheels are travelling over a bump, the upper end of the rod serving as a stop to limit the amount of deflection of the spring and therefore the extent of upward movement of the caster wheels. The downward movement of the caster wheels is limited by stops 332 on the bracket 66 which limit the rocking movement of the lever arms 62 about the fulcrum pivot 64.

Figure 10:
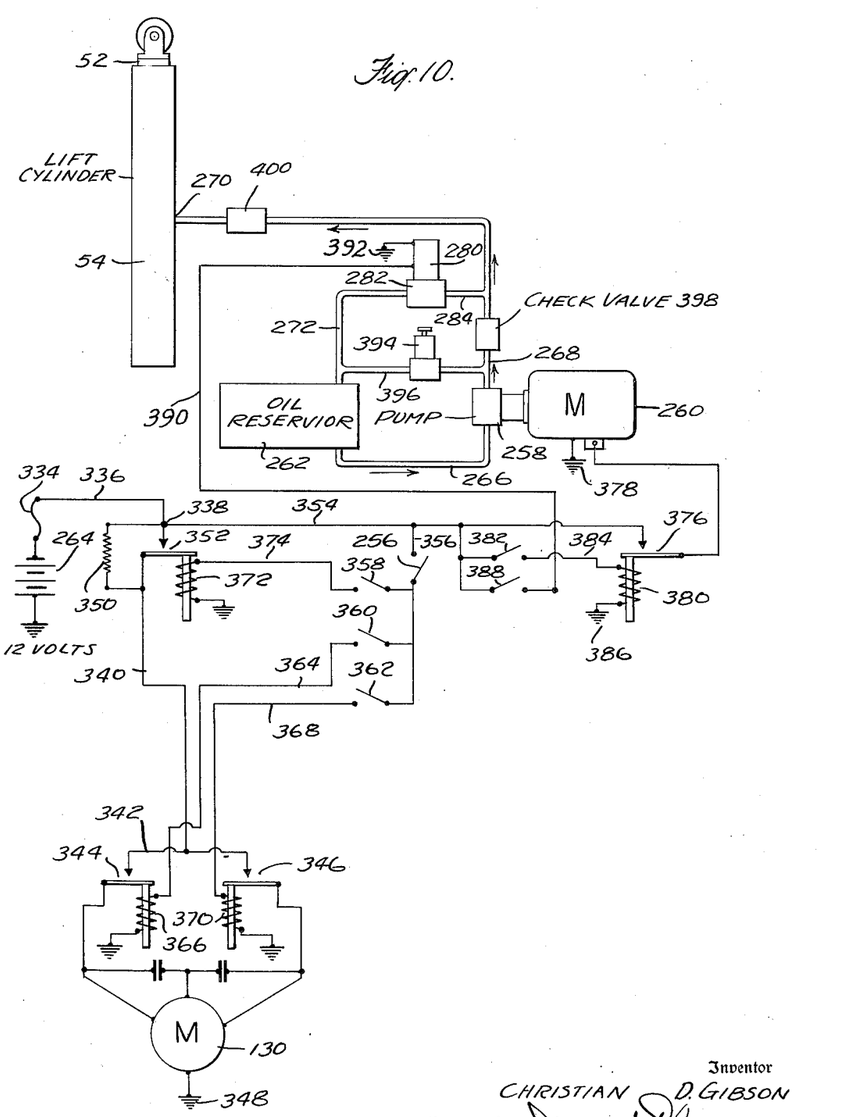
Figure 10 is a diagram showing the electric circuits and the hydraulic connections.

In Figure 10 is shown a combined wiring diagram and hydraulic circuit diagram. Referring to this diagram it will be seen that the battery 264 is grounded on one side and has a connection through a fuse 334 to the other side 336 of the main circuit. The circuit 336 branches at 338 and the branch 340 goes through a reversing contactor box 342 in which are a forward switch 344 and a reverse switch 346 controlling the direction of rotation of the motor 130 which is grounded at 348. The switches 344 and 346 are solenoid operated as hereinafter described. Located in the branch 340 of the main circuit is a low speed resistance 350 which may be short-circuited for high speed by a solenoid controlled switch 352.

The branch 354 of the main circuit has a second branch 356 in which is located the dead man switch 256. The branch 356 is connected to one side of each of the manually controlled switches 358, 360 and 362 which control the operation of the driving motor. As labeled on the drawing, the "Forward Switch" 360 closes a circuit through wire 364 to the solenoid 366 that operates the forward switch in the reversing contactor box and thus energizes the motor 130 to drive the truck forward. The "Reverse Switch" 362 closes a circuit through wire 368 and solenoid 370 to actuate the reversing switch 346 and thus energize the motor to drive the truck backwards. Unless the switch 358 be closed the current to the motor must pass through the low speed resistor 350 and the driving of the motor in either direction is at low speed.

As above suggested, the resistance 350 may be short-circuited through the solenoid operated switch 352. The solenoid 372 which controls the switch 352 is energized by closing of the manually controlled "High Speed Switch" 358 which completes the circuit through the wire 374 and solenoid 372 to the ground. Thus the closing of the switch 360 and the switch 358 will cause the motor to drive the truck forward at high speed and the closing of the switch 362 and the switch 358 will cause the motor to drive the truck backward at high speed.

The branch 354 passes through a solenoid controlled switch 376 to the pump operating motor 260 which, as shown, is grounded at 378. Solenoid 380 which operates the switch 376 is energized through a manually controlled switch 382, hereinabove described as push button operated, in a branch line 384 from the branch 354 which is grounded at 386. Closing of the switch 382 starts the pump motor 260 and causes liquid to be introduced under pressure into the cylinder of the jack or ram 54 to lift the load carrying fork or platform.

Lowering of the load carrying fork or platform is effected through a solenoid controlled valve 282 which permits the liquid in the cylinder of the jack or ram 54 to flow back to the oil reservoir as hereinabove set forth. The solenoid 280 which controls the operation of the valve 282 is energized by the closing of a switch 388 in a branch circuit 390 from the branch 354 grounded at 392, the switch 388 being herein shown and described as push button operated. As shown in the hydraulic circuit diagram, the circuit is provided with the usual relief valve 394, which relieves excess pressure in the main line through a branch line 396 back to the reservoir 262, and also with the usual check valve 398 that maintains the lifting pressure on the plunger 52. There is also usually provided a flow regulator 400 which controls the lowering speed of the lifting mechanism.

From the foregoing description it will be seen that the improved construction and arrangement of the parts of the power driven material handling truck hereinabove described and shown in the accompanying drawings makes possible a truck of this type of extremely short length which can operate in close quarters and narrow aisles in which few if any conventional power trucks can operate. It will further be seen that the truck, while having four wheel support and thus having the lateral stability of a four wheel vehicle, has the turning ability of a three wheel vehicle with fifth wheel steer.

What is claimed as new is:

1. A power driven material handling truck having, in combination, a base frame, front supporting wheels, a rear combined driving and steering wheel mounted upon said base frame to swing about a vertical axis intersecting its axis of rotation and a rear supporting caster wheel swivel-mounted on said frame, said steering and driving wheel being located at one side of the axis of symmetry of the truck structure and the rear supporting caster wheel being located on the other side of said axis of symmetry.

2. A power driven material handling truck according to claim 1 in which a turret, mounted to turn in the base frame about the vertical steering axis, has therein, above the steering and driving wheel, a motor and transmission for driving said wheel and also has therein bearings for said wheel, a platform for the operator being provided over the swivel-mounted rear supporting wheel.

3. A power driven material handling truck according to claim 2 in which the driving motor has its driving shaft arranged vertically.

4. A power driven material handling truck according to claim 2 in which the turret is bodily adjustable vertically in the base frame to compensate for wear of the steering and driving wheel tire.

5. A power driven material handling truck according to claim 2 in which, in front of both the turret and the operator's platform, a storage battery is located which has a length substantially coextensive with the width of the truck and has a more than usual cell height, whereby its dimension lengthwise of the truck may be comparatively small.

6. A power driven material handling truck according to claim 1, in which one of the rear wheels which are located upon opposite sides of the axis of symmetry has a resilient articulated connection to the base frame to permit relative vertical movement of said wheels.

7. A power driven material handling truck according to claim 1 in which a turret, mounted to turn in the base frame about the vertical steering axis, has therein, above the steering and driving wheel, a motor and transmission for driving said wheel and also has therein bearings for said wheel, the steering and driving wheel being turnable about the steering axis through an overall angle of more than 180° and the swivel mounted rear supporting wheel being turnable through an agle of 360°.

8. A power driven material handling truck having, in combination, a base frame and four-wheel support therefor comprising two supporting wheels located near one end thereof on opposite sides of the longitudinal axis of symmetry, a driving wheel located near the other end thereof on one side of said axis of symmetry and mounted to swing about a vertical axis for steering and a fourth supporting caster wheel on the opposite side of said axis from said steering and driving wheel.

9. A power driven material handling truck according to claim 8 in which resilient means between the caster and the base frame permit vertical movement of said caster relative to the driving wheel.

10. A power driven material handling truck according to claim 8 in which a turret, mounted to turn in the base frame about the vertical steering axis, has therein, above the steering and driving wheel, a motor and transmission for driving said wheel and also has therein bearings for said wheel, a platform for the operator being located over the fourth supporting wheel.

11. A power driven material handling truck according to claim 8 in which one of the last mentioned two wheels has a resilient articulated connection to the base frame to permit relative vertical movement between said wheel and the base.

12. A power driven material handling truck according to claim 1 in which a carrier for the caster wheel is mounted on the caster wheel swivel for vertical movement relative thereto, spring means being interposed between the caster wheel carrier and said swivel to provide resilient resistance to said vertical movement.

13. A power driven material handling truck according to claim 12 in which the caster wheel carrier comprises a lever fulcrumed upon the caster wheel swivel for vertical swinging movement.

14. A power driven material handling truck according to claim 12 in which stops positively limit the movement of the caster wheel carrier both toward and away from the caster wheel swivel.

CHRISTIAN D. GIBSON.

REFERENCES CITED

The following references are of record in the file of this patent:

UNITED STATES PATENTS

| Number | Name | Date |
|---|---|---|
| 1,830,310 | Apple | Nov. 3, 1931 |
| 2,368,122 | Dunham | Jan. 30, 1945 |
| 2,370,866 | Lewis | Mar. 6, 1945 |
| 2,394,458 | Lull | Feb. 5, 1946 |
| 2,395,323 | Framhein | Feb. 19, 1946 |
| 2,420,110 | Thostenson | May 6, 1947 |